March 4, 1930.  E. E. BLANKENSTEIN ET AL  1,748,969
METHOD OF TESTING MATERIALS
Filed Nov. 15, 1927
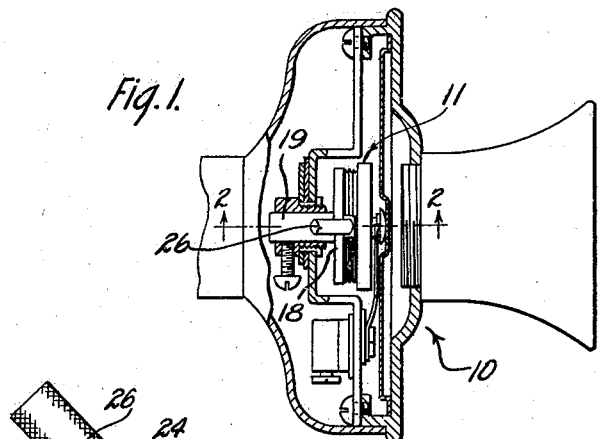
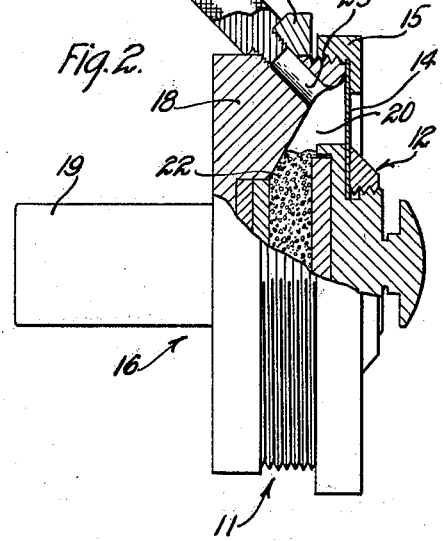
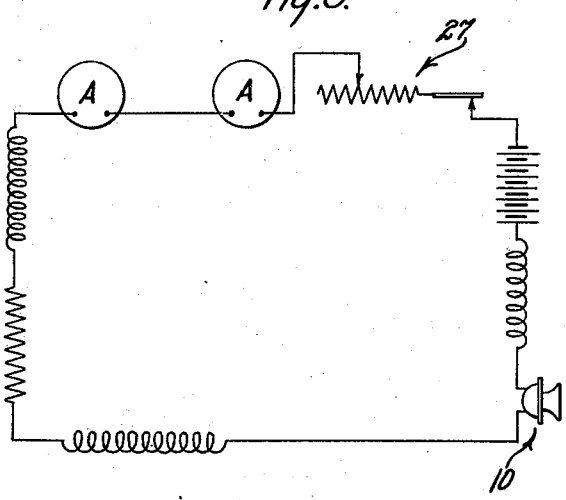
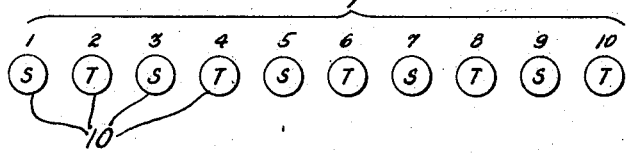
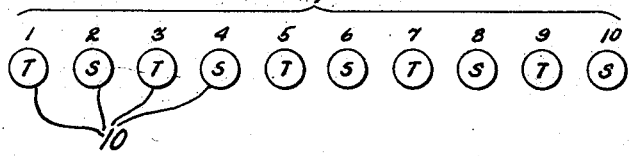
Inventors
Edward E. Blankenstein
Chester M. Coulter
By H. Mathien Att'y.

Patented Mar. 4, 1930

1,748,969

UNITED STATES PATENT OFFICE

EDWARD EVANS BLANKENSTEIN AND CHESTER MILLER COULTER, OF CHICAGO, ILLINOIS, ASSIGNORS TO WESTERN ELECTRIC COMPANY, INCORPORATED, OF NEW YORK, N. Y., A CORPORATION OF NEW YORK

METHOD OF TESTING MATERIALS

Application filed November 15, 1927. Serial No. 233,405.

This invention relates to methods of testing materials, and more particularly to methods of and apparatus for testing granular carbon used in transmitters.

In performing certain tests on granular material, such as carbon used extensively in telephone transmitters and the like, it has heretofore been the practice in some instances to include transmitters containing samples or lots of carbon within certain types of testing apparatus. In employing such apparatus for conducting the tests, care must be exercised in order to maintain the uniform operation of the testing apparatus so that the variations determined by the successive tests which are conducted will serve to indicate variations in the characteristics of the carbon tested and not variations in cooperative relationship of the parts constituting the testing apparatus. In instances where the arrangement of the transmitter parts must be adjusted to permit the association therewith of granular carbon, it requires skill and the expenditure of considerable time to make such adjustments. Thus, one of the problems presented in conducting tests on granular carbon resides in the elimination of variations resulting from factors other than the inherent characteristics of the carbon tested.

The primary objects of this invention are the provision of simple and efficient methods of expeditiously testing materials.

In accordance with the general features of the invention, one embodiment thereof, by means of which the improved method of testing may be effectively practiced, consists in a transmitter having a vibration responsive means or button which is apertured to allow the convenient insertion and removal of granular carbon. By such a means a method may be conveniently practiced wherein samples of carbon may be successively tested under identical conditions within a transmitter of known electrical and mechanical characteristics without dismantling any of the transmitter parts during the course of the testing operations. The method may also be practiced which enables a comparative cross-check testing of carbon samples with standard lots of carbon with dispatch and desired accuracy in such a manner as to positively eliminate the introduction of errors or differences other than those resulting from the inherent characteristics of the carbon tested.

These and other objects will be apparent from the following detailed description when considered in connection with the accompanying drawing, wherein Fig. 1 is a side elevational view of a transmitter equipped with a vibration responsive means or button which is representative of one embodiment of the invention by means of which the improved method of testing granular carbon may be effectively practiced;

Fig. 2 is a sectional view of the transmitter button taken on the line 2—2 of Fig. 1, a portion thereof being shown in elevation;

Fig. 3 is a circuit diagram for illustrating one of the electrical tests to which transmitters are subjected, and Figs. 4 and 5 are diagrammatic representations of a series of transmitters, these figures being shown for the purpose of more clearly setting forth the improved cross-check method of testing granular carbon.

Referring now to the drawings wherein like numerals have been employed to designate similar parts throughout the various figures, it will be observed that for the purpose of illustrating one embodiment of the invention whereby the methods of testing may be practiced, a telephone transmitter denoted generally by the numeral 10 is disclosed in Fig. 1, this transmitter being shown partially in section for the purpose of more clearly showing a vibration responsive means or button 11 conveniently mounted therein. This transmitter button 11 includes a front electrode assembly denoted generally by the numeral 12 (Fig. 2) which is centrally supported by a diaphragm 14 which is marginally secured in position by means of a clamping ring 15. The button 11 also includes a back electrode assembly indicated by the numeral 16 having a flange 18 which forms an enlarged portion of a shank 19. A space or chamber 20 is presented between the front and back electrode assemblies 12 and 16, which serves to retain a supply of granular carbon 22 in position between said assemblies. It will be clear that the back electrode 16 is stationary while the front electrode is movable in response to vibrations transmitted thereto.

In order to conveniently supply the granular carbon 22 to the chamber 20 an aperture 23 is provided in the outer wall of the chamber which extends through the flange 18, the lower extremity of the aperture terminating within the chamber 20 and the upper extremity thereof terminating within a projecting portion 24 and threaded to receive a knurled plug 26. To supply the chamber 20 with granular carbon it is only necessary to unthread the plug 26 and introduce the carbon within the aperture 23. Likewise, the carbon 22 may be conveniently removed from the chamber 20 by positioning the transmitter button 11 so that the aperture 23 is positioned at the bottom thereof to permit carbon to be removed from the chamber by the force of gravity. Having a conveniently refillable vibration responsive means or transmitter button 11 as described, renders possible the testing of successive samples of carbon without the necessity of dismantling the transmitter parts for the purpose of removing carbon from or refilling the chamber 20.

In order to test samples of carbon having unknown characteristics, it is desirable in certain instances to make comparative tests with similar samples of standard carbon having known characteristics. In such instances the apparatus just described serves very effectively to permit the performance of such comparative tests with very great accuracy. By reason of the fact that the transmitter button 11 is refillable without necessitating the dismantling of any of the transmitter parts, successive tests on samples of carbon may be made without introducing any errors which might result if mechanical adjustment of the transmitter parts should be made between each successive testing operation. Thus, for example, if a sample of carbon is introduced within the chamber 20 and subjected to a resistance test which might be performed by including the transmitter within an electrical circuit 27 as clearly shown in Fig. 3, this sample could be removed from the chamber and another sample of carbon introduced and subjected to the same resistance test without rearranging transmitter parts. Any differences which might result in subjecting these two samples to the above mentioned test would clearly be due to the inherent characteristics of the carbon because no errors would be present which might be introduced if a mechanical adjustment of the electrode assemblies or other cooperating parts were necessary before each test was conducted.

In testing granular carbon, it has been found in certain instances that variable factors other than those resulting from the cooperating arrangement of the transmitter parts must be taken into consideration in order to accurately determine variations in the carbon to be tested from a known lot of standard carbon. Thus, for example, such factors as variations in the operating characteristics of the electrical testing apparatus other than the transmitter proper which might be included within the circuit 27 or other testing circuits would have a tendency of introducing errors or differences in results obtained upon the performance of successive tests. Obviously, the determination of differences under such conditions might not indicate the variation in quality of the tested carbon alone, but might also indicate variations in the operating conditions of the testing apparatus. Other factors which should be considered are the variations in humidity and other atmospheric conditions under which the tests are conducted. To positively preclude the introduction of error or variations in the final results of the tests other than those variations resulting from the inherent characteristics of the carbon tested, a convenient cross-check method of testing may be employed. To more fully understand the practice of this method, reference is directed to the diagrammatic representations of transmitters disclosed in Figs. 4 and 5. As indicated diagrammatically in Fig. 4, a group of ten transmitters or any other desired number thereof, may be employed, five of these transmitters indicated by the letter "S" being provided with a supply or lot of standard carbon having known characteristics. The remaining half of these transmitters indicated by the letter "T" are provided with a sample of test carbon from a supply thereof having unknown characteristics and all of these quantities contained within the ten transmitters are then subjected to certain tests such, for example, as the resistance test which may be performed by the use of the apparatus disclosed in Fig. 3. Upon the completion of these tests, transmitters containing the standard carbon are refilled with samples of the test carbon and the transmitters containing the test carbon are refilled with the standard carbon.

From the foregoing it will be understood that these transmitters may be refilled without disturbing the arrangement of the cooperating parts thereof. The carbon in the refilled transmitters is now subjected to tests similar to those just described, and thus it will be apparent that upon the completion of all of these tests all of the transmitters will have been used to test quantities of standard carbon and likewise all of said transmitters will have been used to test in a similar manner samples of test carbon. The results or determinations made by the use of the standard carbon within the testing apparatus are summed up and divided by the total number of transmitters which in the particular instance will be ten. Likewise, the results obtained in the apparatus by using the test carbon will be summed up and divided in a similar manner. The difference between the results obtained by using the standard carbon and those obtained by using the test carbon will serve to accurately indicate the difference in the quality or characteristics of the quantity of test carbon from which the samples were selected as compared with the characteristics of the standard carbon. The fact that the arrangement of the cooperative parts of the transmitters is not disturbed during the performance of the above described tests, positively eliminates the introduction of any errors or differences which might otherwise result if the transmitters were dismantled in order to refill them for each test. By employing one-half of the total number of transmitters for testing standard carbon and the other half for testing samples of carbon having unknown characteristics and then reversing the operation by replacing the quantities of standard and test carbon with quantities of test and standard carbon, respectively, the balancing out or elimination in the final result of any variations or differences in the operating characteristics of the electrical testing apparatus in which the transmitters were included is positively effected. In other words, if the first group of test and standard carbon is tested in an apparatus operating under certain predetermined conditions and the second group is then tested in the same apparatus which is then operating under entirely different conditions, these varying operating conditions of the apparatus or atmospheric differences will not effect the final determinations of the test and therefore only variations in the characteristics of the tested carbon will be determined. The above mentioned balancing out effect will be more apparent when it is observed that equal numbers of the group of ten transmitters are subjected to conditions incident to the testing operations of the apparatus and therefore any variations in such operations will be balanced out.

While the invention is particularly applicable for use in connection with the testing of granular carbon and the like, it will be clear that the cross-check method just described readily lends itself for use in connection with the testing of numerous types of material or apparatus, wherein a possible single variable factor or characteristic is to be determined. Thus, when certain characteristics of parts or elements, such as the transmitter parts described above remain constant during the performance of testing operations and it is only necessary to determine a difference or variation in the characteristics of one element associated therewith, namely, granular carbon, the described method of conducting comparative cross-check tests may be effectively employed in order to positively eliminate or balance out any noticeable variations in the operation of the testing apparatus which is used. It will also be understood that the described cross-check method of testing may be employed in testing piece parts and the like where the testing apparatus is of a complicated design or nature and in which variations in the operation of the apparatus may vary considerably from time to time. By practicing the method described, all of these variations resulting from the operation of the complicated arrangement of the cooperating parts may be balanced out so that the ultimate result obtained in performing the test will not be affected by any variations in the operation of the testing apparatus. From the foregoing it will be seen that the invention has been described in connection with the testing of a particular type of vibration responsive means having a single element which might introduce a variable factor, namely, a quantity of granular carbon which might vary in certain characteristics from a desired standard, and it is to be understood that the invention is capable of many other applications where comparative tests are required and therefore should be limited only by the scope of the appended claims.

What is claimed is:

1. The method of testing materials which consists in adding a part having an unknown characteristic to cooperating parts having known characteristics to render the assembly operative, subjecting the asembly of parts to operating conditions, and measuring the operativeness of the assembly to determine the characteristics of the first mentioned part.

2. The method of testing materials which consists in including a part having an unknown characteristic with other assembled parts of known characteristics to complete the assembled relation thereof and render the assembly operative, subjecting the completed assembly to operating conditions, and determining the resultant characteristics of the assembly to test the unknown part.

3. The method of testing materials, which consists in subjecting an operative assembly of cooperating part to operating conditions, determining the characteristics of the assembly, replacing one of the parts with a part having an unknown characteristic, maintaining the assembled relation of the remaining parts during the replacement of the part, again subjecting the assembly to operating condition, and determining the characteristics of the assembly to determine the comparative characteristics of the unknown part.

4. The method of testing materials, which consists in subjecting an operative assembly of cooperative parts having known characteristics to operating conditions, determining the operativeness of the assembly, replacing one of the parts with a part having an unknown characteristic, maintaining the assembled relation of the remaining parts during the replacement, then subjecting the thus assembled parts to like operating conditions, and again determining the operativeness of the assembly to determine the comparative characteristics of the unknown part.

5. The method of testing materials, which consists in subjecting an assembly of cooperative parts including a standard part to testing conditions, similarly subjecting another like assembly including a part having an unknown characteristic to testing conditions, replacing the standard and unknown parts with unknown and standard parts, respectively, and then subjecting these assemblies to testing conditions to determine any variation in the unknown parts from the standard parts.

6. The method of testing materials, which consists in associating a sample of granular carbon with a vibration responsive means, subjecting the vibration responsive means to operating conditions, determining the effect of said subjection, removing the granular carbon after testing, and maintaining the relationship of the cooperating parts of the vibration responsive means during the removal of the carbon.

7. The method of testing granular materials, which consists in associating a quantity of granular material with a vibration responsive means of known characteristics, subjecting the vibration responsive means to operating conditions, replacing the material with another quantity of granular material, maintaining the relationship of the cooperating parts of the vibration responsive means during the replacement of the material, and determining the comparative effect of the subjection upon the different materials.

8. The method of testing granular materials, which consists in associating a sample of granular material having an unknown characteristic with a vibration responsive means, subjecting the vibration responsive means to operating conditions, replacing the sample of material with a quantity of material having a known characteristic, maintaining the relation of the cooperative parts of the vibration responsive means during the replacement of the materials, then subjecting the vibration responsive means to similar operating conditions, and determining the effect of the subjection on the different materials.

9. The method of testing granular materials, which consists in successively associating quantities of granular material with a vibration responsive means, maintaining the relation of the cooperating parts of the vibration responsive means during each association of the granular material therewith, subjecting the vibration responsive means to operating conditions after each association of the granular material, and ascertaining the variation between the different materials.

10. The method of testing granular materials, which consists in subjecting a quantity of standard granular material to a test within a vibration responsive means, subjecting a similar quantity of granular material having an unknown characteristic to a test within another vibration responsive means, replacing the quantities of standard and unknown material, respectively, with quantities of unknown and standard material, repeating the testing operations, maintaining the relation of the cooperative parts of the vibration responsive means throughout the testing operations, and comparing the results of the tests to determine the quality of the material having an unknown characteristic.

11. The method of testing granular carbon for use with transmitters, which consists in subjecting a sample of carbon within a transmitter to a test, refilling the transmitter with another sample of carbon material, repeating the testing operation, maintaining the relation of the cooperating parts of the transmitter during the refilling thereof, and comparing the results of the tests to determine the relative quality of the samples.

12. The method of testing material which consists in alternately subjecting assemblies of cooperative parts including a standard part, and assemblies of cooperative parts including a part having unknown characteristics to testing conditions, replacing the standard parts and unknown parts with unknown and standard parts, respectively, subjecting the assemblies to the same testing conditions, and determining the mean variation of the unknown parts from the standard parts.

In witness whereof, we hereunto subscribe our names this 31st day of October, A. D. 1927.

EDWARD EVANS BLANKENSTEIN.
CHESTER MILLER COULTER.